Aug. 15, 1933. C. F. WAGNER 1,922,182
REGULATING APPARATUS
Filed Oct. 30, 1931   2 Sheets-Sheet 1
Fig. 1.
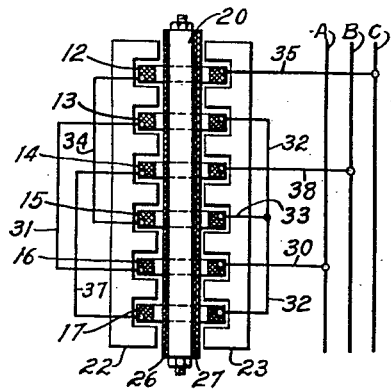
Fig. 3.
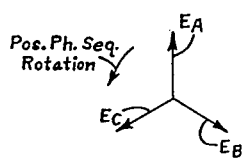
Fig. 2.
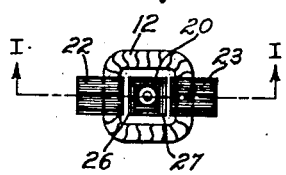
Fig. 4.
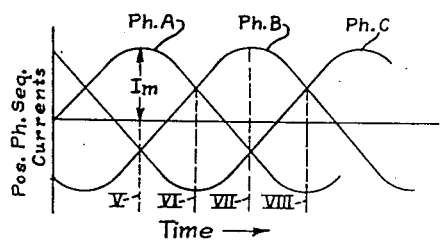
Fig. 5.  Fig. 6.  Fig. 7.  Fig. 8.
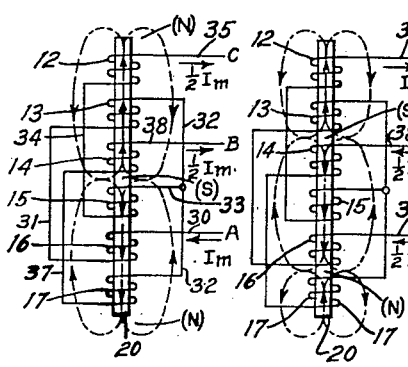
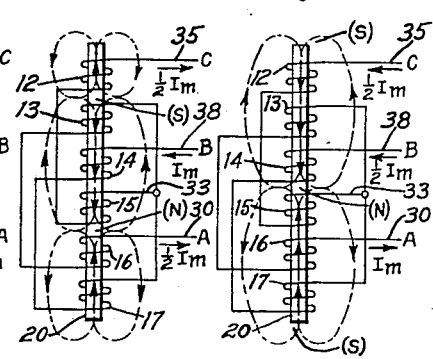
WITNESSES:
R. S. Williams
C. F. Bryant
INVENTOR
Charles F. Wagner.
BY Franklin E. Hardy
ATTORNEY

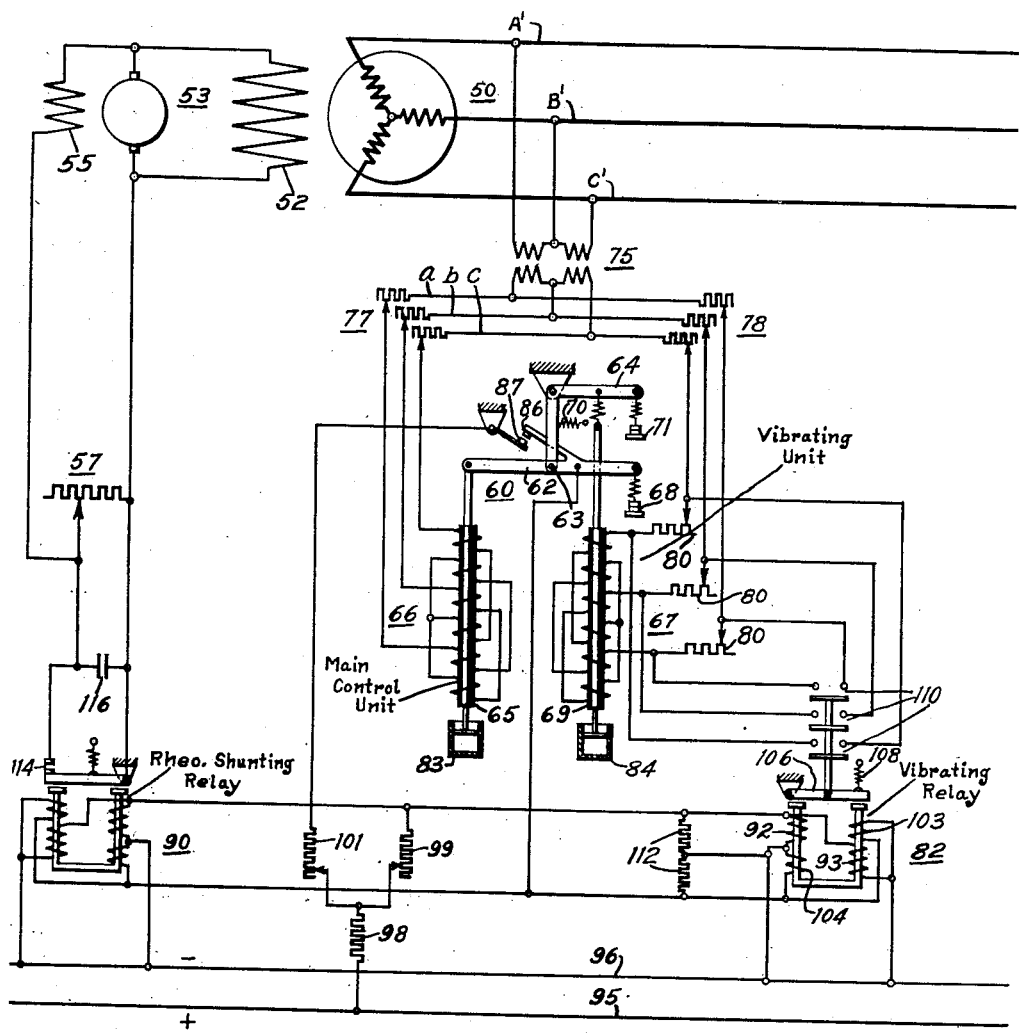

Patented Aug. 15, 1933

UNITED STATES PATENT OFFICE 1,922,182

REGULATING APPARATUS

Charles F. Wagner, Swissvale, Pa., assignor to Westinghouse Electric & Manufacturing Company, a Corporation of Pennsylvania Application October 30, 1931. Serial No. 572,066

9 Claims. (Cl. 171—119)

My invention relates to electrical regulators and has particular relation to voltage-responsive means for regulators associated with polyphase alternating-current circuits.

In the use of regulators with polyphase circuits, it is desirable, and frequently essential, that the regulator respond to a potential that is representative of the voltages acting in all of the several phases of the circuit. In the early applications of regulators to polyphase circuits, it was customary to connect the voltage-responsive element of the regulator to one phase only of the circuit to be regulated. While, for conditions of balanced voltage such a connection is satisfactory, it is frequently found inadequate, in practice, since very serious unbalance in the phase voltages of the regulated circuit may exist, particularly upon the occurrence of certain types of faults.

Consequently, a regulator energized from one phase only is subjected to erroneous actuation so that, in certan cases, it may be caused to act in a manner exactly opposite to that which the effect of the fault or other connection required. For example, if the condition is such that the voltage acting in the regulator-connected phase rises, while that of the remaining phases more than proportionately decreases, the regulator will act to further lower the voltage of the circuit-supply or circuit-regulating source instead of furnishing the voltage-raising impulse actually required. In the case of a system involving interconnected-synchronous machines particularly, the stability will thereby be greatly weakened and other undesirable results will accrue.

Such disadvantages may be eliminated, as is known, by providing means for controlling the regulator in response to the voltages in all of the several phases of the circuit. With such means, an impulse that is representative of the several phases will be imparted to the regulator and the desired corrective action will be effected. One well known method of accomplishing this result is to interpose between the voltage-responsive element of the regulator and the polyphase circuit an electrical network which impresses upon the regulator a potential that, at all times, is proportional to the voltages acting in all of the several circuit phases.

Such networks, to which the term "positive-phase sequence-voltage" is commonly applied, and a preferred form of which is shown and described in U. S. Patent No. 1,571,224, granted February 2, 1926 to C. F. Alcutt, and assigned to the Westinghouse Electric and Manufacturing Company, are found to be completely satisfactory from a regulator-performance standpoint. However, the additional apparatus required by a positive-phase sequence network combination adds materially to the cost and bulk of the complete regulating system, and for this, as well as for other reasons, a demand has arisen for means of obtaining a comparable result through the use of more compact and less expensive equipment. My invention is directed to the provision of such means.

It is accordingly an object of my invention to provide a regulator that is responsive to the voltages acting in all of the several phases of a polyphase circuit to be regulated.

Another object of my invention is to provide a regulator of the type described that is relatively simple in construction and inexpensive to build and that gives regulator-performance comparable to that obtainable through the use of positive-phase sequence networks.

A further object of my invention is to provide a multi-phase voltage-responsive element that is readily adaptable for substitution in place of single-phase voltage responsive elements now used with regulators extensively known and utilized in the art.

A still further object of my invention is to provide a voltage-responsive element of the type described that responds to the summation of the positive-phase sequence and the negative-phase sequence voltages acting in a polyphase circuit with which the regulator is associated.

In practicing my invention, I attain these and other advantageous results by providing electromagnetic means so disposed and energized by the voltages acting in the several phases of the circuit to be regulated that a uni-directional moving magnetic field is set up thereby. In this field, I dispose a magnetic-damping or eddy-current-creating element in a manner that the movement of the field is caused to exert a uni-directional force thereon, which force is communicated to the contact-making or change-initiating means of the regulator.

It will be apparent that the requirements already outlined are met by my invention, since the magnitude of the force mentioned will vary in accordance with the average value of the several voltages which energize the magnetic-field-producing means thereby causing the desired representative impulse to be communicated to the regulator. In addition, the device is relatively inexpensive and has broad application possibilities, since, in physical form, it may be made to closely correspond to the solenoid-type of voltage-responsive element so extensively utilized by regulators now well known in the art.

My invention will best be understood through a description of a specific embodiment thereof, when taken in conjunction with the accompanying drawings, in which Figure 1 is a sectional view, taken along the line I—I of Fig. 2, of a preferred embodiment of an electromagnet employed in my invention, adapted for use with a three-phase circuit;

Fig. 2 is a plan view of the electromagnet shown in Fig. 1;

Fig. 3 is a diagram of vectors illustrating the instantaneous phase relations of a set of balanced positive-phase sequence voltages which may act in the three-phase circuit from which the windings of the electromagnet shown in Fig. 1 are illustrated as being energized;

Fig. 4 is a diagram of symmetrically-displaced sine waves representing the currents which flow in the windings of the device of my invention when the energizing circuit has only positive-phase-sequence voltages, represented in Fig. 3, acting therein;

Figs. 5, 6, 7 and 8 are simplified diagrammatic representations of the windings and central core member of the electromagnet shown in Fig. 1 which illustrates the manner in which the moving magnetic field is produced, by respectively showing the energizing currents and the resulting magnetic fluxes for the consecutive instants of time designated by V, VI, VII and VIII in the diagram of Fig. 4, and Fig. 9 is a diagrammatic representation of a well known vibrating type of regulator actuated in accordance with my invention and applied to control the voltage of a three-phase circuit.

Referring to the drawings, and particularly to Figs. 1 and 2 thereof, the embodiment of my invention there illustrated comprises six similar windings 12, 13, 14, 15, 16 and 17 disposed about, and symmetrically spaced along the length of, a central core member 20. To strengthen the flow of magnetic flux which these windings are caused to set up in the central member, cooperating magnetic core pieces 22 and 23 are placed around the windings in the manner shown to reduce the reluctance of the magnetic flux paths and to localize the flux distribution in a manner to be explained.

As illustrated, members 20, 22 and 23 are built up of thin laminations of magnetic iron, such a construction being preferred as it reduces the eddy current losses and provides for manufacturing economy, as is well known in the alternating-current magnetic-circuit art.

Intermediate the centrally disposed member 20 and the cooperating core pieces 22 and 23, I place strips of conducting material, represented at 26 and 27, through which the magnetic flux must pass and upon which the moving field is caused to exert a force in a manner to be explained. This force is caused to actuate the regulator through the medium of any suitable mechanical or other connection.

While the modification of my invention depicted in the drawings comprises six separate energizing windings interconnected in the manner shown, it will be understood that a different number of windings or different specific connection thereof may also be utilized. It is necessary that the windings be so disposed as to cause a continuously moving magnetic field through the central portion of the solenoid assembly, and it is immaterial how this result is achieved as regards the specific combination of the windings and their interconnection.

Likewise, modifications may also be made in the specific form of magnetic circuit structure shown, it being understood that any suitable disposition of magnetic material in association with the energizing windings of the unit, which causes the moving magnetic field to pass through suitably placed conducting strips in such manner that the motion of the field sets up eddy currents therein and causes a force to be exerted thereon, may be embodied in the voltage-responsive unit of my invention.

Thus, for example, it is immaterial whether the centrally disposed core member 20 be made integral with the conducting strips 26 and 27 or be stationarily mounted separate and apart from these strips, since its purpose is to provide a low reluctance path for the magnetic flux. In the modification shown, the integral form of construction is illustrated, since it appears to possess manufacturing and other advantages.

Likewise while conducting-material strips 26 and 27 are illustrated on either side of the centrally disposed core, it will be apparent that variations in this feature of the invention may readily be made, as, for instance, the substitution of a tube of circular or rectangular cross section which completely surrounds the centrally disposed core, or of other modifications which yield the desired result of causing the moving magnetic field to exert a force upon the conducting material disposed therein.

In order that the electrical windings illustrated may produce a moving magnetic field, they are suitably interconnected with each other, as shown, and energized from the three conductors of the alternating-current circuit, with which the regulator is associated, these conductors being designated in Fig. 1 as A, B and C. For a positive-phase rotation of voltages acting in the three-phase circuit, as represented by the vector diagram of Fig. 3, in which vectors $E_A$, $E_B$ and $E_C$ respectively represent voltages acting in phases A, B and C of the circuit of Fig. 1, the resulting magnetic field produced by the energized windings will be caused to move upwardly. The manner in which such movement is effected is more fully explained by Figs. 4, 5, 6, 7 and 8.

In Fig. 4, the three symmetrically-displaced sine waves, designated by the markings $Ph.A$, $Ph.B$ and $Ph.C$, indicate the currents supplied to the regulator-unit windings from circuit conductors A, B and C of Fig. 1 when the positive phase-sequence voltages represented in Fig. 3 act in the three-phase energizing circuit.

The instantaneous winding-energizing currents and resulting magnetic fluxes for the instants of time designated in Fig. 4 by V, VI, VII and VIII, are respectively shown in Figs. 5, 6, 7 and 8, in which figures the electromagnet of Fig. 1 is represented in simplified form, the central core member 20 and the associated energizing windings only being shown.

At instant V, for example, phase A supplies an energizing current designated by $I_m$ in Fig. 4. This current flows from circuit conductor A, through conductor 30, winding 16, conductor 31, winding 13, conductor 32, and from that point through two separate paths, one of which comprises conductor 33, winding 15, conductor 34, winding 12 and conductor 35 to circuit conductor C, and the other of which comprises winding 17, conductor 37, winding 14 and conductor 38 to circuit conductor B. Reference to the diagram of Fig. 4 indicates that, at this particular instant V, the magnitude of the current returning to conductors B and C through each of the paths named is $\frac{1}{2} I_m$.

The direction of the resulting magnetomotive force set up by each of the several windings is indicated by the arrow drawn inside of each of the windings and, for the current conditions named, it will be seen that the windings 12, 13 and 14 all send flux in an upwardly direction through core member 20, while windings 15, 16 and 17 all send flux in a downwardly direction. These individual fluxes combine in the manner shown to flow out of both ends of core member 20, thereby producing at each end an effective north magnetic pole, designated by (N). The flux returns by way of magnetic members 22 and 23 (not shown in Figs. 5, 6, 7 or 8) through paths indicated by the dotted lines to a point in core member 20 intermediate windings 14 and 15, thereby establishing at this point a south magnetic pole indicated by (S).

At a later instant VI, the energizing current relations are changed to the extent that circuit conductors A and B each supply a current designated by ½ $I_m$ which currents combine and return to the circuit conductor C, there having a value of $I_m$. As a result of this change, the winding 14 reverses the direction of its magnetomotive force to a downward direction, and the winding 17 reverses the direction of its magnetomotive force to an upward direction and the (S) pole set up in armature 20 is moved upwardly to a point intermediate windings 13 and 14, while the (N) pole moves from the lower end of the armature 20 upwardly to a point intermediate the windings 16 and 17.

At a later instant VII, the current relations are further changed to the extent that the (S) pole is moved upwardly to a point intermediate the windings 12 and 13, while the (N) pole is transferred to a point intermediate the windings 15 and 16, and at the instant VIII, the (S) pole is at the top of the armature member, while the (N) pole has moved up to a point between the windings 14 and 15. This progressive upward shifting of the magnetic poles is continuous, thus producing a uni-directional moving magnetic field.

This moving magnetic field in sweeping along the length of the conducting strips 26 and 27 sets up eddy currents in them, which currents interact with the moving flux in a manner that a force, or magnetic drag effect, is exerted thereon, which force tends to pull the strips in the direction of flux motion. This action will be recognized as being comparable to that taking place in a well known type of induction meter in which a conducting-disc element is subjected to an effective moving magnetic field which causes it to be pulled in the direction of motion of the field, as well as to the action taking place in other equally well known types of equipment, such as inductor motors for instance.

The moving magnetic field thus exerts upon conducting strips 26 and 27 a continuous upwardly-acting force that varies in intensity with the speed of flux movement and the total strength of the flux. It will be recognized that the speed of movement is substantially constant, since it is a direct function of the frequency of the voltages acting in the energizing circuit.

The intensity or strength of the magnetic flux will thus be seen to depend upon an effective potential determined by the summation of the voltages acting in all of the several phases of the energizing circuit, so that this force is truly representative of the average phase voltage, which is the condition desired.

It will be apparent that a reversal of the phase rotation of the energizing voltages will similarly cause the magnetic field to move downwardly. Thus, the substitution of negative-phase-sequence voltages in the three-phase circuit, in the place of positive-sequence potentials, will cause the central element of the unit to be subjected to a downwardly acting force, in the particular connection shown, instead of upward force. The same effect can also be had by reversing any two of the three energizing conductor connections from the three-phase circuit.

The solenoid form of construction of the voltage-responsive element of my invention renders it readily adaptable to known types of regulators. One such adaptation to a vibrating type of regulator disposed to control the voltage of an alternating current generator is illustrated in Fig. 9.

In Fig. 9, a generator to be regulated is illustrated at 50, and comprises armature windings connected with the conductors A', B' and C' of a three-phase circuit, and a field winding 52 that is energized by a direct-current exciting generator 53. The exciter 53 is provided with an armature winding that is connected to field winding 52 and with a field winding 55 that may be excited from any suitable source, such as from the armature winding terminals, through a circuit which includes an excitation-control rheostat 57. A regulator actuated in accordance with my invention is illustrated generally at 60 and is disposed to control the effective resistance of rheostat 57 in accordance with the voltages between circuit conductors A', B' and C'.

As illustrated, the regulator 60 is of a well known type with the exception that the polyphase-voltage-responsive units of my invention, described above, are employed as represented in Fig. 9 at 66 and 67, unit 66 being the main-control magnet, and unit 67 an anti-hunting or vibrating magnet.

The regulator 60 further comprises a floating lever 62 mounted by the pivot 63 at the lower end of a bell crank lever 64. The floating lever 62 is acted upon by two opposing forces, one of which is the weight of the plunger member 65 of the main-control electromagnet 66, which is partially counterbalanced by a weight 68 at the other end of the lever, and the other of which is the upwardly acting force exerted by the windings of the electromagnet 66 upon the plunger 65.

The bell crank lever 64 is biased in a counter-clockwise direction by the pull of a spring 70 which acts against, and partially overcomes the combined force of a counter-balancing weight 71 and the weight of the plunger member 69 of the vibrating unit 67. The pull of spring 70, is assisted by the upward pull of the plunger 69 of the vibrating magnet 67.

The windings of the main control unit 66 and of the vibrating unit 67 of the regulator are energized from the regulated circuit conductors A', B' and C'. In the application illustrated in Fig. 9, such energization is effected through the use of suitable potential transformers 75, the secondary windings of which are connected with conductors $a$, $b$ and $c$, connection from these conductors to the windings being made through adjustable resistors 77 and 78 which may be included for the purpose of making adjustments for different voltages. It will be understood that if the voltage of the regulated circuit is of a magnitude suitable for connecting directly to the unit windings, the potential transformers 75 and resistors 77 and 78 may be omitted.

In the circuit of the windings of the vibrating unit 67 are included series resistors 80 which are adapted to be short-circuited by a vibrating relay 82, that is controlled by the regulator in a manner to be described. Dashpots 83 and 84 are connected to the armatures of the main control and vibrating units, respectively, in order that stable operation of the regulator may be assured.

The floating lever 62 is provided with an arm carrying a contact member 86 that is actuated to engage a stationary contact member 87 when the voltage in the regulated circuit conductors A', B' and C' drops below a predetermined value.

Closing a circuit through the main regulator contacts 86 and 87 operates the vibrating relay 82 and a rheostat-shunting relay 90 to close circuits through the contacts of these relays. Closure of the circuit through the contacts 110 of relay 82 short-circuits the resistors 80 in series with the windings of vibrating unit 67 of the regulator, thereby increasing the pull of said vibrating unit on the bell crank lever 64 and thus introducing a force tending to separate the main regulator contacts 86 and 87.

As shown, relays 82 and 90 are of similar construction, each being illustrated as of the differential type, thus operating to reduce the flux in the relay armature upon engagement of contacts 86, 87. To attain this result, relay 82, for example, is provided with two parallel-connected, constantly-energized coils 92 and 93 that are connected with any suitable constant potential source, such as is represented by circuit conductors 95 and 96 at the lower portion of the drawing. This energizing circuit extends from supply conductor 95 through resistors 98 and 99, through relay coils 92 and 93 in parallel circuit relation, to the conductor 96.

A control circuit extends from the conductor 95, through resistor 98, resistor 101, the regulator contacts 86, 87 and two parallel-connected demagnetizing coils 103 and 104 to the conductor 96. The coils 103 and 104 operate upon engagement of the contact members 86, 87 to reduce the magnetic pull exerted by the coils 92 and 93 upon the armature 106, thereby permitting the armature to be raised by means of a spring 108, thus causing the closure of a circuit through the relay contact members 110 to short-circuit the previously mentioned resistors 80. Discharging resistors 112 are provided connected in parallel relation to the relay coils.

The rheostat-shunting relay 90 is energized in the same manner as relay 82, so that closure of the main regulator contacts 86 and 87 causes contacts 114, carried by relay 90, and which are connected to shunt the active portion of exciter-field rheostat 57, to be biased to the closed position. To reduce arcing, a condenser 116 is connected in shunt relation with contacts 114.

In operation, the regulator 60 and the relays 82 and 90 intermittently close and open circuits through their respective contacts. Closure of the regulator contacts 86 and 87 causes the relay 82 to short-circuit the resistors 80 that are connected in the winding-energizing circuit of the vibrating unit 67 and thus increases the upwardly-acting magnetic pull which more nearly neutralizes the downward pull of the movable member of the unit. This moves bell crank lever 64 in a direction to separate and open regulator contacts 86, 87. Relay 82 then removes the short-circuit from resistors 80 and restores the degree of energization of regulator unit 67 to the original lower value causing regulator contacts 86 and 87 to again engage. The action just described is repeated so that a continuous opening and closing of the regulator contacts and the associated relays is effected.

Rheostat-shunting relay 90 thus intermittently short-circuits the active portion of rheostat 57, the percentage of total time during which such short-circuits are in effect being sufficient to maintain the voltage of regulated generator 50 at the desired value.

A drop in the voltage of generator 50 reduces the energization of both voltage-responsive units of the regulator, and by causing the upward magnetic pull on the movable member of main-control unit 66 to thus be lowered, brings contact 86, carried by floating lever 62, into earlier engagement with contact 87. As a result, the portion of time during which the regulator contacts are engaged during each vibration cycle is increased and rheostat-shunting relay 90 similarly lengthens the periods during which rheostat 57 is short-circuited. This lowers the effective resistance of the rheostat and, by increasing the field current supplied to exciter 53, raises the excitation and the voltage of regulated generator 50.

Similarly, a rise in the voltage of generator 50 increases the energization of main control unit 66 of the regulator and thereby shifts contact 86 to a position which is less intimate with respect to contact 87. The portion of time during which the regulator contacts are engaged is thus lowered and relay 90 correspondingly shortens the short-circuit periods of rheostat 57. This raises the effective resistance of the rheostat and correspondingly lowers the excitation and voltage of regulated generator 50.

It will be apparent that, through the use of the voltage-responsive units 66 and 67 of my invention regulator 60 is caused to respond to the average voltage acting in all of the phases of the three-phase circuit represented by conductors A', B' and C', instead of to the potential acting in only one of the phases, as is the case with regulators of this type supplied with the usual single-phase voltage change-responsive units. As has been mentioned, furthermore, the solenoid type of construction to which my invention adapts itself causes these improved units to be readily adaptable to regulator assemblies now known and extensively utilized in the art. It will be seen that, since this construction is relatively inexpensive, it permits of material savings over the added cost of phase-voltage segregating networks and other comparable expedients heretofore required to adapt a regulator for representative response to polyphase voltages.

The performance of a regulator utilizing the voltage-responsive units of my invention is found to compare very favorably with that of a regulator utilizing the positive-phase sequence voltage networks hereinbefore discussed. Such networks act to prevent the negative-phase sequence and zero-phase sequence voltages, which may be present at times of fault on a three-phase circuit, from influencing the regulator. The device of my invention similarly prevents the zero-phase sequence voltages from acting upon the regulator, although allows, as further analysis of the energizing circuits for the windings of the voltage-responsive unit will indicate, the negative-phase sequence voltages to be effective. Such voltages act in direct opposition to the positive-sequence voltages which only are present during normal balanced conditions of a three-phase circuit, so that, in the case of a fault which produces negative-sequence voltages in the regulated circuit, the force exerted upon the movable member of the change-responsive unit of my invention is reduced by an amount greater than the reduction in magnitude of the positive-phase sequence voltages which the fault might institute, would account for.

In the majority of regulator applications, this feature is of the nature of an asset, since the speed of response of regulator action, upon the occurrence of a fault, is artificially increased and the stability of the power system, of which the regulated circuit may form a part, is thereby improved. In all except rare cases, the faults which occur in three-phase power circuits are of relatively short duration or are quickly cleared by the action of protective equipment associated with the circuit, or else are of such a serious nature as to make operation of this circuit during their persistence impossible or impractical, so that a shut down of the circuit-energizing source is required. For such cases it will be seen that the voltage-change-emphasizing characteristics introduced by the responsiveness of the device of my invention to negative-phase-sequence voltages is not detrimental but is of advantage, particularly in stability improvement, as hereinbefore pointed out.

However, in the rare cases mentioned in which a persisting type of fault, of sufficiently low severity to permit continued operation of the regulated circuit, occurs, a regulator equipped with the change-responsive units of my invention will still operate in a manner which, for practical purposes, is satisfactory. Although in such a case, the regulator will be caused to maintain the circuit at a positive-phase-sequence voltage somewhat in excess of the desired or normal value, because of the neutralizing action of the negative-phase-sequence voltages which the fault may introduce, the magnitude of such excess will seldom be sufficient to be of particular disadvantage.

Although I have shown and described a certain specific embodiment of my invention, and illustrated it as being applied to one particular form of electrical regulator, I am fully aware that many further modifications and applications thereof are possible. My invention, therefore, is not to be restricted except insofar as is necessitated by the prior art and by the spirit of the appended claims.

I claim as my invention:

1. In combination, a polyphase electrical circuit, a regulator therefor comprising means responsive to a potential that is representative of the voltages acting in all of the phases of said circuit, said means comprising a conducting member, a plurality of windings so disposed about said member and energized by the voltages acting in the several phases of said circuit that a magnetic field continuously traverses the member in one longitudinal direction to exert a unidirectional force thereupon.

2. A polyphase-circuit regulator comprising a solenoid comprising a plurality of windings positioned longitudinally along an axis and a conducting material element centrally disposed therein, means for so energizing the windings of said solenoid in accordance with the voltages in the several phases of the polyphase circuit that a continuously-moving magnetic field is produced causing a unidirectional force to be exerted upon said centrally disposed element.

3. In combination with a three-phase electrical circuit, a regulator therefor comprising means responsive to the summation of the positive-phase-sequence and negative-phase-sequence voltages acting in said circuit, said means comprising a conducting-material member, and a plurality of windings so disposed about and longitudinally along the length of said member and energized in accordance with the voltages in the three phases of said circuit that a magnetic field is caused to continuously move axially in one direction through the member, said moving magnetic field thus exerting a unidirectional force upon the member to operate the regulator.

4. Means for causing an electrical regulator to be representatively responsive to the voltages acting in the several phases of a polyphase circuit, comprising a solenoid having a plurality of windings jointly energized by all of said voltages in a manner that a magnetc field is produced which moves in one direction through said solenoid, and a conducting-material element disposed inside of the solenoid in a manner that said moving field exerts a continuous force thereon, said element-force being disposed to operate the regulator.

5. In a regulator system, a polyphase electric circuit, windings connected to each phase of said circuit, said several windings being arranged along a common axis and so positioned as to develop magnetic field poles continuously traveling in a given direction along said axis, and means responsive to the intensity of said magnetic field poles for controlling the voltage of said polyphase circuit.

6. In a regulator system, a polyphase electric circuit, windings connected to each phase of said circuit, said several windings being arranged along a common axis and so positioned as to develop magnetic field poles continuously traveling in a given direction along said axis, a magnetic core member axially disposed inside of said windings, a conducting-material member disposed intermediate said core member and the windings, and means responsive to the force exerted upon said conducting-material member by said moving magnetic field poles for controlling the voltage of said polyphase circuit.

7. In a regulator system, a polyphase electric circuit, windings connected to each phase of said circuit, said several windings being arranged along a common axis and so positioned as to develop magnetic field poles continuously traveling in a given direction along said axis, a magnetic core member axially disposed inside of said windings, a conducting-material member disposed intermediate said core member and the windings, and means responsive to the force exerted upon said conducting-material member for controlling the voltage of said polyphase circuit, said force being caused by eddy current in the conducting-material member set up by the moving magnetic field poles.

8. In an electrical regulator for a polyphase alternating-current circuit, means for operating the regulator in accordance with the voltages in the several phases of said circuit comprising solenoid means so connected to said polyphase circuit as to produce a unidirectional moving magnetic field, and a member upon which said field exerts a unidirectional force.

9. In combination, a polyphase electrical circuit, voltage adjusting means therefor, contact making means for controlling said voltage adjusting means, and regulating apparatus for actuating said contact making means comprising electromagnetic means energized in accordance with the voltages acting in the several phases of said polyphase circuit to produce a magnetic field that moves continuously in one direction, and an axially movable element actuated by said moving field.

CHARLES F. WAGNER.